(12) United States Patent
Ando

(10) Patent No.: US 6,949,040 B2
(45) Date of Patent: Sep. 27, 2005

(54) BICYCLE REAR DERAILLEUR

(75) Inventor: Yoshiaki Ando, Kawachinagano (JP)

(73) Assignee: Shimano Inc., Osaka (JP)

(*) Notice: Subject to any disclaimer, the term of this patent is extended or adjusted under 35 U.S.C. 154(b) by 231 days.

(21) Appl. No.: 10/370,449

(22) Filed: Feb. 24, 2003

(65) Prior Publication Data

US 2003/0171177 A1 Sep. 11, 2003

(30) Foreign Application Priority Data

Mar. 8, 2002 (CN) .......................... 02106975 A

(51) Int. Cl.⁷ .......................... F16H 63/00; B62J 13/00
(52) U.S. Cl. .......................... 474/82; 474/144
(58) Field of Search .............................. 474/78–82, 144

(56) References Cited

U.S. PATENT DOCUMENTS

| | | | | |
|---|---|---|---|---|
| 1,636,327 A | * | 7/1927 | Roe | 474/144 |
| 4,619,632 A | * | 10/1986 | Nagano | 474/80 |
| 5,328,414 A | | 7/1994 | Ancarani Restelli | |
| 5,470,277 A | * | 11/1995 | Romano | 474/70 |
| 5,620,383 A | | 4/1997 | Patterson et al. | |
| 5,919,106 A | | 7/1999 | Ichida | |
| 5,924,946 A | * | 7/1999 | Calendrille, Jr. | 474/82 |
| 6,135,904 A | | 10/2000 | Gutherie | |
| 6,149,541 A | | 11/2000 | Nakamura et al. | |
| 6,287,228 B1 | * | 9/2001 | Ichida | 474/82 |
| 6,350,212 B1 | * | 2/2002 | Campagnolo | 474/80 |
| 6,685,586 B2 | * | 2/2004 | Dal Pra' | 474/82 |

FOREIGN PATENT DOCUMENTS

| | | | | |
|---|---|---|---|---|
| DE | 2821738 A1 | * | 12/1978 | B62M/9/04 |
| EP | 0585472 A1 | * | 3/1994 | B62M/9/12 |
| EP | 0657346 A2 | * | 6/1995 | B62M/9/12 |
| EP | 1099620 A2 | * | 5/2001 | B62M/9/12 |

* cited by examiner

Primary Examiner—Marcus Charles
(74) Attorney, Agent, or Firm—Shinjyu Global IP Counselors, LLP

(57) ABSTRACT

A bicycle rear derailleur is basically provided with a base member, a link mechanism, outer and inner plate members, a guide pulley and a tension pulley. At least one of the outer and inner plate members includes a bent portion integrally formed with the at least one of the outer and inner plate members to prevent a chain from disengaging from at least one of the tension pulley and the guide pulley. The bent portion is formed by bending an inner section of the at least one of outer and inner plate members in a direction towards the other of the at least one of the outer and inner plate members. The inner section is spaced inwardly from an external peripheral edge of the at least one of the outer and inner plate members.

22 Claims, 12 Drawing Sheets

BICYCLE REAR DERAILLEUR

CROSS REFERENCE TO RELATED APPLICATIONS

This application is claims a priority of Chinese Patent Application 02 1 06975.1, filed on Mar. 8, 2002.

BACKGROUND OF THE INVENTION

1. Field of the Invention

This invention generally relates to a bicycle rear derailleur. More specifically, the present invention relates to a bicycle rear derailleur in which main components, such as inner and outer plate members, are made from lightweight metal or steel plates having relatively smaller areas to thereby decrease the amount of material used.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle as well as the frame of the bicycle. One component that has been extensively redesigned is the bicycle rear derailleur.

As shown in FIG. 2, a conventional bicycle rear derailleur 10 includes a bracket 11 fixed to a frame of a bicycle, a base member 12 supported by the bracket 11, a link mechanism 13 coupled to the base member 12 at one end thereof, a movable member 14 coupled to the other end of the link mechanism 13, an outer plate member 15 movably supported to the movable member 14 and an inner plate member 18 located inwardly of the outer plate member 15 for freely rotatably supporting a guide pulley 16 and a tension pulley 17 between the outer plate member 15 and the inner plate member 18.

Furthermore, in order to prevent a chain winding around the guide pulley 16 and the tension pulley 17 for driving rear sprockets from accidentally disengaging and hence falling off from the bicycle rear derailleur 10, a disengagement prevention portion 19 is often provided at a position near the guide pulley 16 or the tension pulley 17. The disengagement prevention portion 19 extends substantially across a gap between the outer plate member 15 and the inner plate member 18. Thus, the chain can be prevented from significantly disengaging from the guide pulley 16 or tension pulley 17. FIG. 2 shows an example in which the disengagement prevention portion 19 is provided near the tension pulley 17 of the bicycle rear derailleur 10.

As shown in FIGS. 2 and 3, the disengagement prevention portion 19 of the conventional bicycle rear derailleur 10 includes a first protruded portion 15a and a second protruded portion 18a. The first protruded portion 15a protrudes rearwardly and outwardly from a tail end of the outer plate member 15. The second protruded portion 18a protrudes rearwardly and outwardly from a tail end of the inner plate member 18 farther than the first protruded portion 15. Moreover, the second protruded portion 18a is bent such that a front end edge of the second protruded portion 18a is located very close to a front end edge of the first protruded portion 15a. Thus, the disengagement prevention portion 19 is formed substantially across the gap between the outer plate member 15 and the inner plate member 18.

In addition, various parts of the bicycle rear derailleur 10 are made from different materials depending on its required mechanical characteristics, such as wear resistance. In general, the bracket 11 is made from lightweight alloys and the link mechanism 13 is made from lightweight alloys or steel. The outer plate member 15 and the inner plate member 18 are generally made from metal plates of lightweight alloys or steel by punching with a punching machine.

The outer plate member 15 of the conventional rear derailleur 10 is formed with a shape as shown in FIG. 4 by punching a metal plate $M_1'$ with a punching die (not shown) of a punching machine (not shown). However, since the outer plate member 15 of the conventional rear derailleur 10 is formed at the tail end thereof with the first outwardly protruded portion 15a protruding rearwardly so as to form a portion of the disengagement prevention portion 19, the overall width of the outer plate member 15 is relatively large. This arrangement prohibits a compact layout of the outer plate members 15 to be punched on the metal plate $M_1'$. In other words, the portion of the metal plate $M_1'$ that is not effectively used, and hence wasted is large. As a result, the manufacturing cost is high for this type of bicycle rear derailleur.

Likewise, the inner plate member 18 of the conventional rear derailleur 10 is formed with a shape as shown in FIG. 5 by punching a metal plate $M_2'$ with a punching die (not shown) of a punching machine (not shown). However, since the inner plate member 18 of the conventional rear derailleur 10 is formed at the tail end thereof with the second outwardly protruded portion 18a protruding rearwardly so as to form a portion of the disengagement prevention portion 19, the overall width of the inner plate member 18 is relatively large, which prohibits a compact layout of the inner plate members 18 to be punched on the metal plate $M_2'$. In other words, the portion of the metal plate $M_2'$ that is not effectively used, and hence wasted is large. As a result, the manufacturing cost is high for this type of derailleur.

In view of the above, it will be apparent to those skilled in the art from this disclosure that there exists a need for an improved bicycle rear derailleur that overcomes the above mentioned problems in the prior art. This invention addresses this need in the art as well as other needs, which will become apparent to those skilled in the art from this disclosure.

SUMMARY OF THE INVENTION

One object of the present invention is to provide a bicycle rear derailleur in which its main components, such as inner and outer plate members, are made from lightweight metal or steel plates having relatively smaller areas to thereby decrease the amount of material used. Hence, the present invention is directed to achieve significant cost reduction and lightweight effect, while performance and functions are kept the same as those of a conventional bicycle rear derailleur of the same type.

The foregoing objects can basically be attained by providing a bicycle rear derailleur for shifting a chain of a bicycle that comprises a base member, a link mechanism, outer and inner plate members, a guide pulley and a tension pulley. The base member is arranged and configured to be coupled to a frame of the bicycle. The link mechanism is coupled at one end thereof to the base member. The movable member is coupled to the other end of the link mechanism. The outer and inner plate members are movably coupled to the movable member and have external peripheral edges defining overall shapes of the outer and inner plate members. The guide pulley is freely rotatably supported between the outer and inner plate members. The tension pulley is freely rotatably supported between the outer and inner plate members. At least one of the outer and inner plate members includes a bent portion integrally formed with the at least one of the outer and inner plate members to prevent the chain from disengaging from at least one of the tension pulley and the guide pulley. The bent portion is formed by bending an inner section of the at least one of outer and inner plate members in a direction towards the other of the at least one of the outer and inner plate members. The inner section is spaced inwardly from the external peripheral edge of the at least one of the outer and inner plate members.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
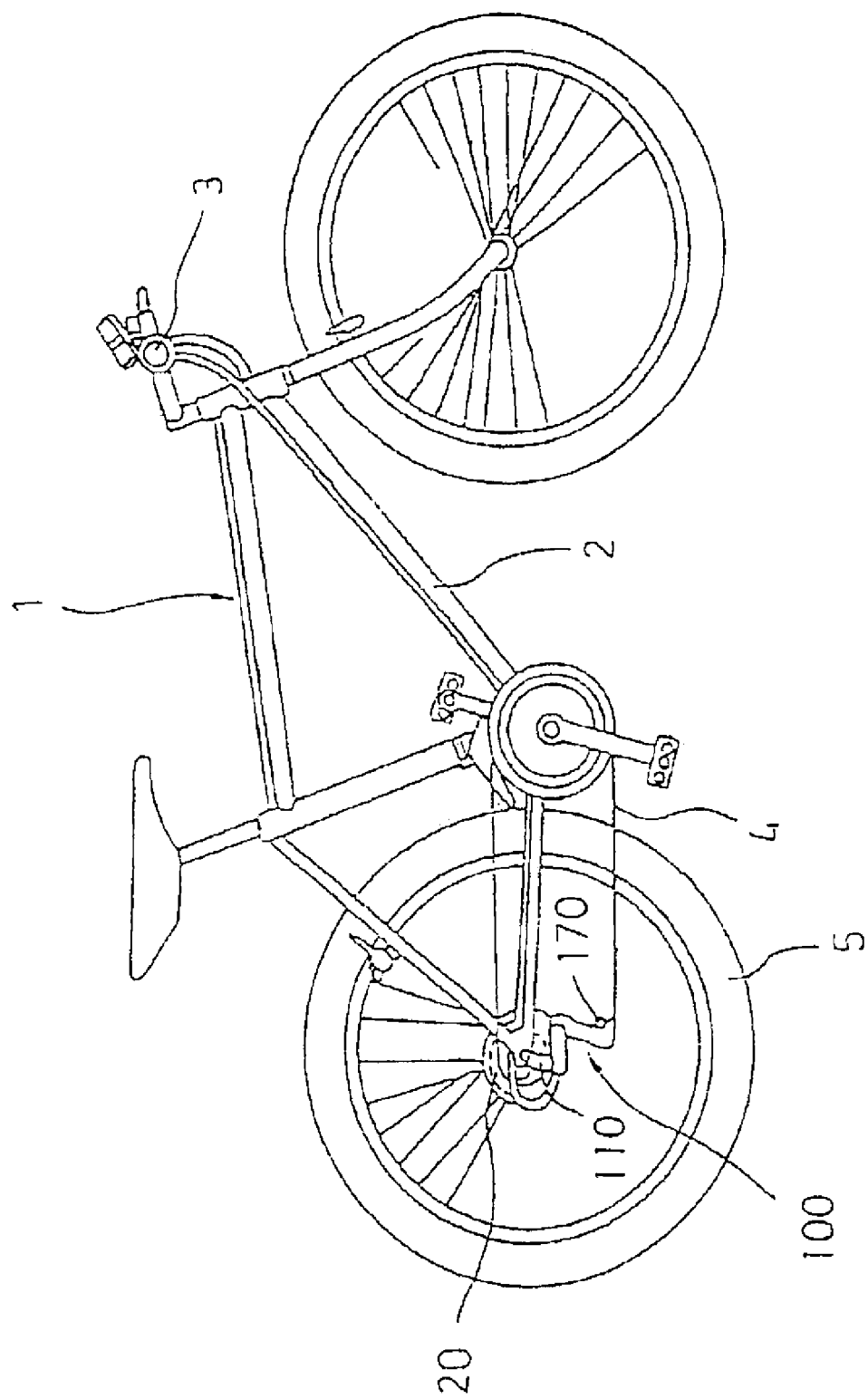
FIG. 1 is a side elevational view of a bicycle equipped with a bicycle rear derailleur in accordance with a first embodiment of the present invention.

Referring to FIGS. 1 and 6–10, a bicycle rear derailleur 100 is illustrated in accordance with a first embodiment of the present invention. As shown in FIG. 1, a multiple-speed bicycle 1 is provided with the bicycle rear derailleur 100 and a plurality of rear sprockets 20 at a rear portion of a frame 2 thereof. To change the speed of the bicycle 1, a rider operates a shifting operating device (not shown) mounted on a handlebar 3 to pull a tension pulley 170 of the bicycle rear derailleur 100 so that a chain 4 originally engaging one of the rear sprockets 20 is moved to be substantially aligned with another one of the rear sprocket 20 for shifting gears.

Figure 6:
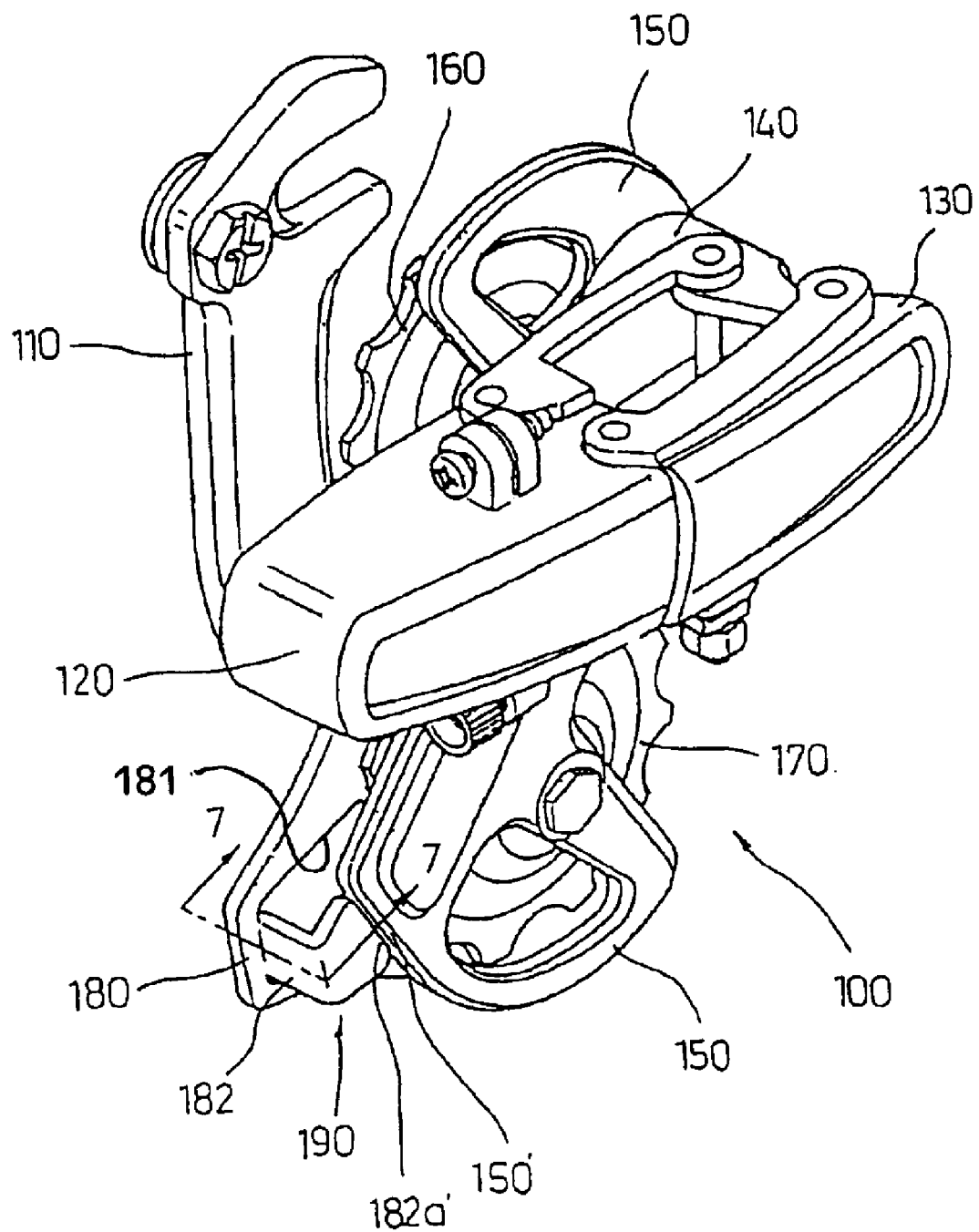
FIG. 6 is a rear end perspective view of a bicycle rear derailleur in accordance with the first embodiment of the present invention.

FIG. 6 is a perspective view of the bicycle rear derailleur 100 according to the first embodiment of the present invention. As shown in the FIG. 6, similar to the conventional bicycle rear derailleur 10 shown in FIG. 2, the bicycle rear derailleur 100 according to the first embodiment of the present invention preferably includes a bracket 110, a base member 120, a link mechanism 130, a movable member 140, an outer plate member 150, an inner plate member 180, a guide pulley 160 and a tension pulley 170. The bracket 110 is arranged and configured to be fixed to the frame 2 of the bicycle 1. The base member 120 is supported by the bracket 110. The link mechanism 130 is coupled to the base member 120 at one end thereof. The movable member 140 is coupled to the other end of the link mechanism 130. The outer plate member 150 is movably supported to the movable member 140. The inner plate member 180 is located inwardly of the outer plate member 150 for freely rotatably supporting the guide pulley 160 and the tension pulley 170 between the outer plate member 150 and the inner plate member 180. Each of the outer plate member 150 and the inner plate member 180 has an external peripheral edge that defines overall shape of the each of the outer plate member 150 and the inner plate member 180. Moreover, the outer plate member 150 and inner plate member 180 are preferably made from metal plates of lightweight alloys or steel by punching with a punching machine.

Furthermore, in order to prevent the chain 4 that is winding around the guide pulley 160 and the tension pulley 170 from accidentally disengaging, and hence falling off from the bicycle rear derailleur 100, a disengagement prevention portion 190 is preferably provided at a position adjacent the tension pulley 170, as shown in FIG. 6. The disengagement prevention portion 190 preferably extends substantially across a gap between the outer plate member 150 and the inner plate member 180. Thus, the chain 4 can be prevented from significantly disengaging from the tension pulley 170.

Figure 2:
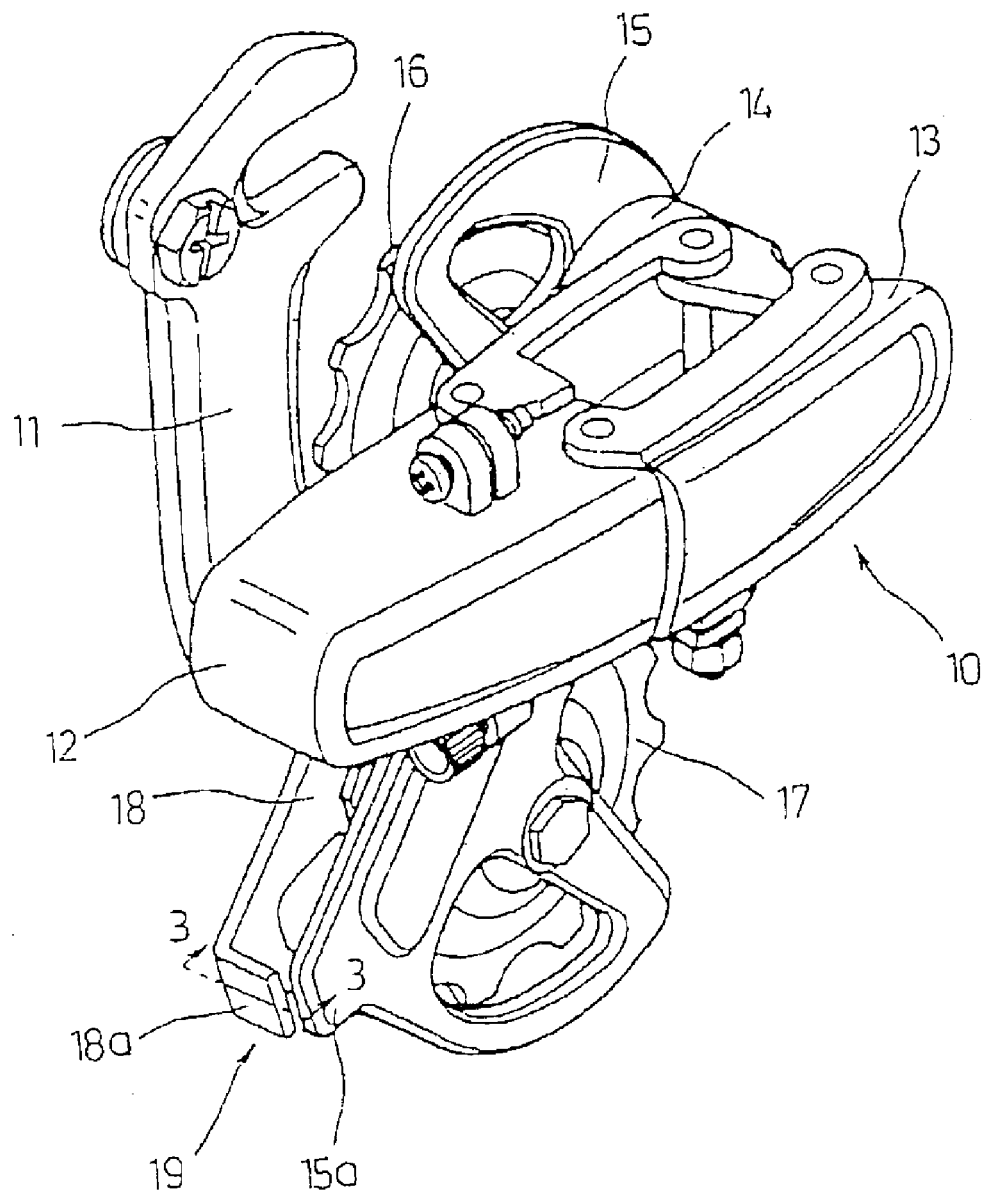
FIG. 2 is a rear end perspective view showing a conventional bicycle rear derailleur.
Figure 3:
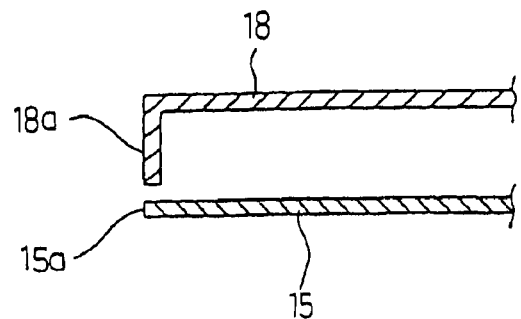
FIG. 3 is a partial cross sectional view of a disengagement prevention portion of the conventional bicycle rear derailleur illustrated in FIG. 2 as seen along section line 3—3 of FIG. 2.

The bicycle rear derailleur 100 of the first embodiment of the present invention is different from the conventional bicycle rear derailleur 10 shown in FIG. 2 in the location at which a disengagement prevention portion 190 is provided and in the configuration of the disengagement prevention portion 190.

As described above, the disengagement prevention portion 19 of the conventional bicycle rear derailleur 10 comprises the first protruded portion 15*a* protruding rearwards outwardly from a tail end of the outer plate member 15, and the second protruded portion 18*a* protruding rearwards outwardly from a tail end of the inner plate member 18 farther than the first protruded portion 15. In the bicycle rear derailleur 100 of the first embodiment of the present invention, on the other hand, the disengagement prevention portion 190 is defined by a bent portion 182 of the inner plate member 180 and a peripheral section 150' of the outer plate member 150 that faces the bent portion 182. The inner plate member 180 is formed with an opening or cutout section 181 and the bent portion 182 is integrally formed with the inner plate member 180 by bending an inner section of the inner plate member 180 that extends from an inner periphery of the cutout section 181. The inner section is bent to extend towards the outer plate member 150. Moreover, the bent portion 182 includes a first bent part 182*a* and a second bent part 182*b*. The second bent part 182*b* extends perpendicularly from the first bent part 182*a* to form an L-shaped member. Furthermore, the bent portion 182 also includes a free end with a peripheral edge or front end edge 182*a*' that faces the external peripheral edge of the outer plate member 150. Thus, the peripheral section 150' of the outer plate member 150 is a section of the external peripheral edge of the outer plate member 150 that faces the front end edge 182*a*' of the bent portion 182. As described above, the disengagement prevention portion 190 is preferably located adjacent to the tension pulley 170. Accordingly, the disengagement prevention portion 190 prevents the chain 4 from disengaging from the tension pulley 170.

Figure 7:
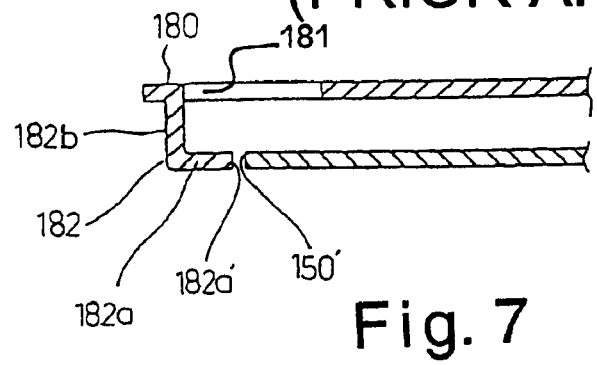
FIG. 7 is a partial cross sectional view of a disengagement prevention portion of the bicycle rear derailleur illustrated in FIG. 6 in accordance with the first embodiment of the present invention as seen along section line 7—7 of FIG. 6.

FIG. 7 shows a partial cross sectional view of the disengagement prevention portion 190 of the bicycle rear derailleur 100 in accordance with the first embodiment of the present invention. The arrangement of the front end edge 182*a*' of the bent portion 182 and the peripheral section 150' of the outer plate member 150, which form the disengagement prevention portion 190, can be clearly observed in FIG. 7. The front end edge 182*a*' and the peripheral section 150' are very close to each other such that the front end edge 182*a*' and the peripheral section 150' define a nearly closed disengagement prevention portion 190.

Figure 8:
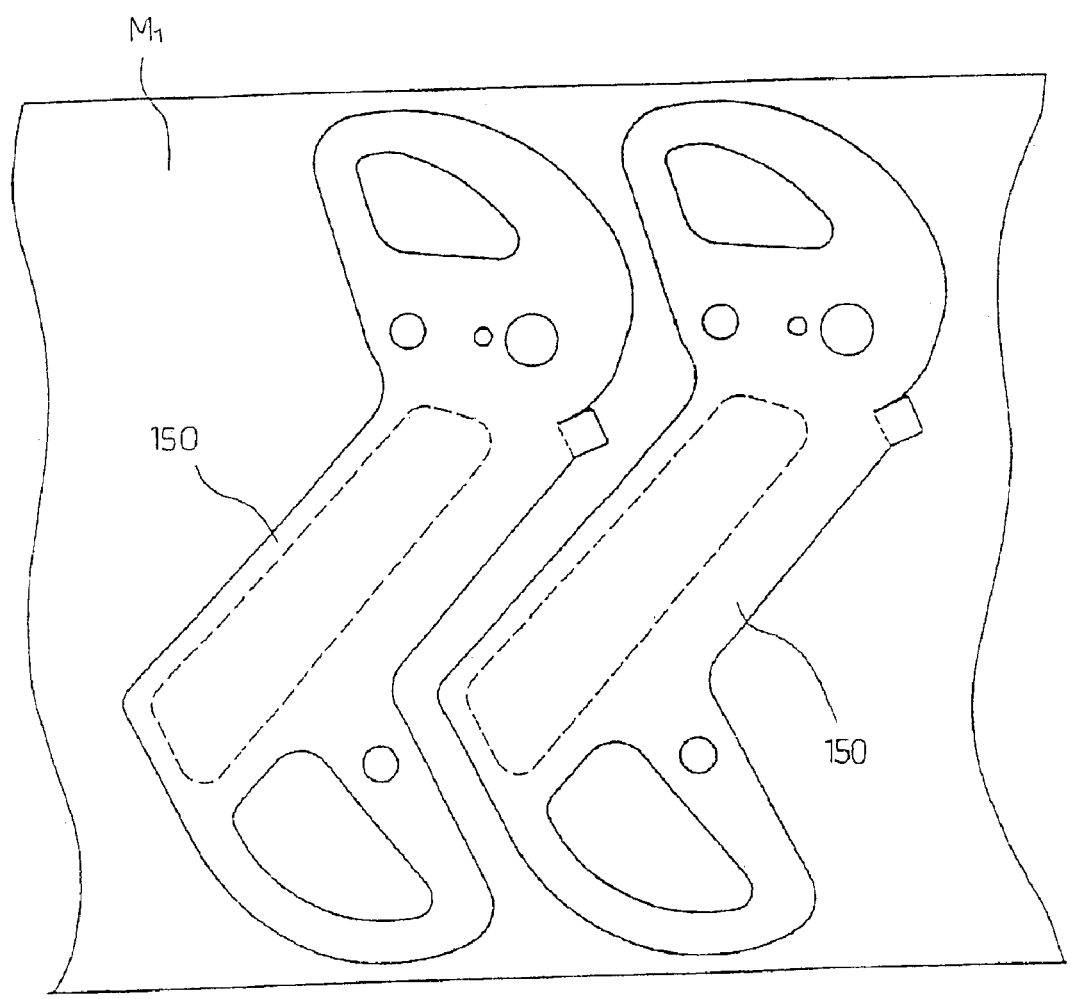
FIG. 8 is a plan view showing a layout of outer plate members on a metal plate to be punched and used for the bicycle rear derailleur illustrated in FIGS. 6 and 7 in accordance with the first embodiment of the present invention.

FIG. 8 shows a layout of a plurality of the outer plate member 150 on a metal plate $M_1$ to be punched by a punching machine (not shown) and used for the bicycle rear derailleur 100 of the first embodiment. As seen in FIG. 8, the outer plate member 150 does not have any protruded portion like the first protruded portion 15*a* of the outer plate member 15 of the conventional bicycle rear derailleur 10 illustrated in FIG. 2. Therefore, the overall width and hence the area of the outer plate member 150 are smaller such that a more compact layout of the plurality of the outer plate member 150 can be arranged on the metal plate $M_1$. Accordingly, the number of the outer plate member 150 which can be punched out from the metal plate $M_1$ of a given size is increased. As a result, a saving of material can be achieved and the weight and cost of the obtained plate member are reduced.

Figure 9:
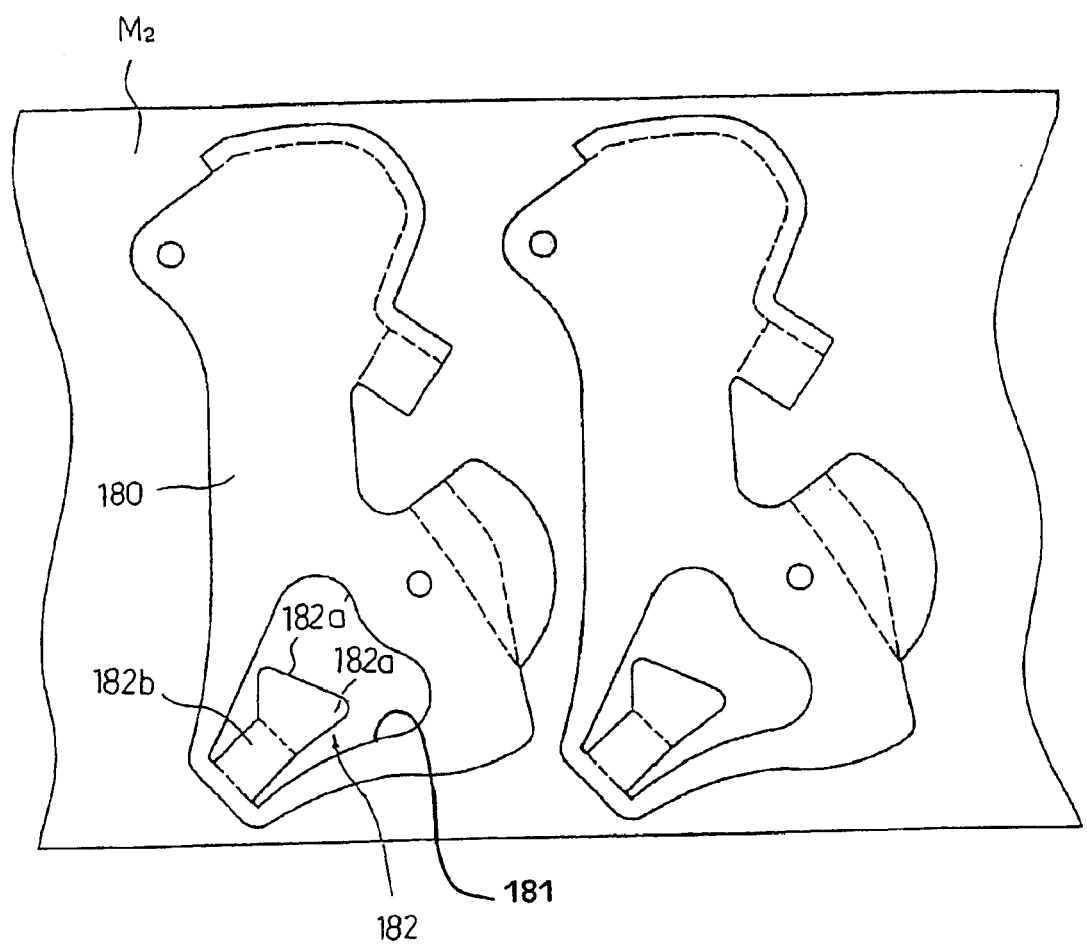
FIG. 9 is a plan view showing a layout of inner plate members on a metal plate to be punched and used for the bicycle rear derailleur illustrated in FIGS. 6 and 7 in accordance with the first embodiment of the present invention.

FIG. 9 shows a layout of a plurality of the inner plate member 180 to be punched on a metal plate $M_2$ by a punching machine (not shown) and used for the bicycle rear derailleur 100 of the first embodiment. As seen in FIG. 9, the bent portion 182 of the inner plate member 180 that forms a part of the disengagement prevention portion 190 is formed from the inner section of material remaining after formation of the opening or cutout section 181 of the inner plate member 180. Therefore, the inner plate member 180 has a shape which does not have any protruded portion like the second protruded portion 18*a* of the inner plate member 18 of the conventional bicycle rear derailleur 10. Thus, the overall width and the area of the inner plate member 180 are smaller such that a more compact layout of the plurality of the inner plate member 180 can be arranged on the metal plate $M_2$. Accordingly, the number of the inner plate member 180 which can be punched out from the metal plate $M_2$ of a given size is increased. As a result, a saving of material can be achieved and the weight and cost of the obtained plate member are reduced.

Moreover, when the inner plate member 180 of the bicycle rear derailleur 100 of the present invention is punched out from the metal plate $M_2$ by the punching machine (not shown), the punching is performed such that the bent portion 182 has a shape as shown in FIG. 9. More specifically, the bent portion 182 includes the first bent part 182*a* having the free end with the front end edge 182*a*' and the second bent part 182*b* connecting an outer frame portion of the inner plate member 180 and the first bent part 182*a*. The profile of the front end edge 182*a*' of the first bent part 182*a* is formed such that the front end edge 182*a*' is located very close to the peripheral section 150' of the outer plate member 150, which faces the front end edge 182*a*', after the bent portion 182 is bent and the bicycle rear derailleur 100 is assembled. For example, the peripheral section 150' of the outer plate member 150 forming the disengagement prevention portion 190 illustrated in FIG. 6 is forwardly and downwardly linearly inclined with respect to the bicycle frame 2. Accordingly, in order to have the front end edge 182*a*' of the bent portion 182 of the inner plate member 180 located very close to the peripheral section 150' of the outer plate member 150, the front end edge 182*a*' of the bent portion 182 of the inner plate member 180 is also formed to be linearly inclined forwardly and downwardly, as seen in FIG. 9. Of course, it will be apparent to those skilled in the art from this disclosure that shape and orientation of the peripheral section 150' of the outer plate member 150 and the bent portion 182 can vary depending on the different types of bicycle designs and/or other various considerations.

Figure 10A:
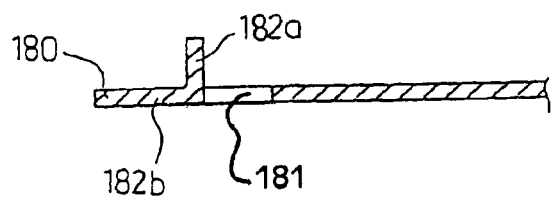
FIG. 10(a) is a schematic cross sectional view of the disengagement prevention portion of the bicycle rear derailleur illustrated in FIGS. 6 and 7, showing a bending step of an L-shaped bent portion of the inner plate member of the bicycle rear derailleur in accordance with the first embodiment of the present invention, wherein the sectional shape of the bent portion is shown after a first bending step.
Figure 10B:
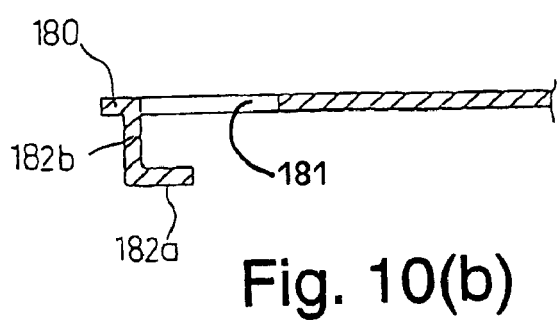
FIG. 10(b) is a schematic cross sectional view of the disengagement prevention portion of the bicycle rear derailleur illustrated in FIGS. 6 and 7, showing a bending step of an L-shaped bent portion of the inner plate member of the bicycle rear derailleur in accordance with the first embodiment of the present invention, wherein the sectional shape of the bent portion is shown after a second bending step.
Figure 4:
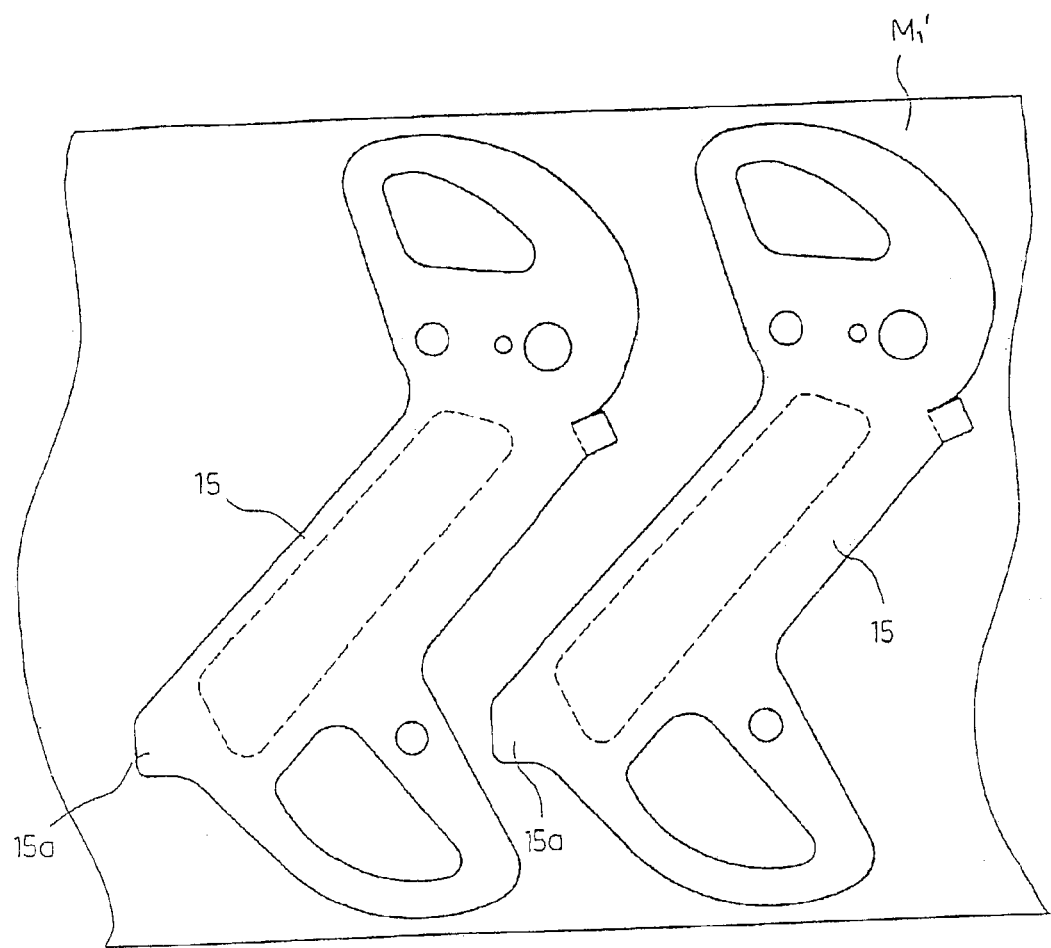
FIG. 4 is a plan view showing a layout of outer plate members on a metal plate to be punched and used for the conventional bicycle rear derailleur illustrated in FIGS. 2 and 3.
Figure 5:
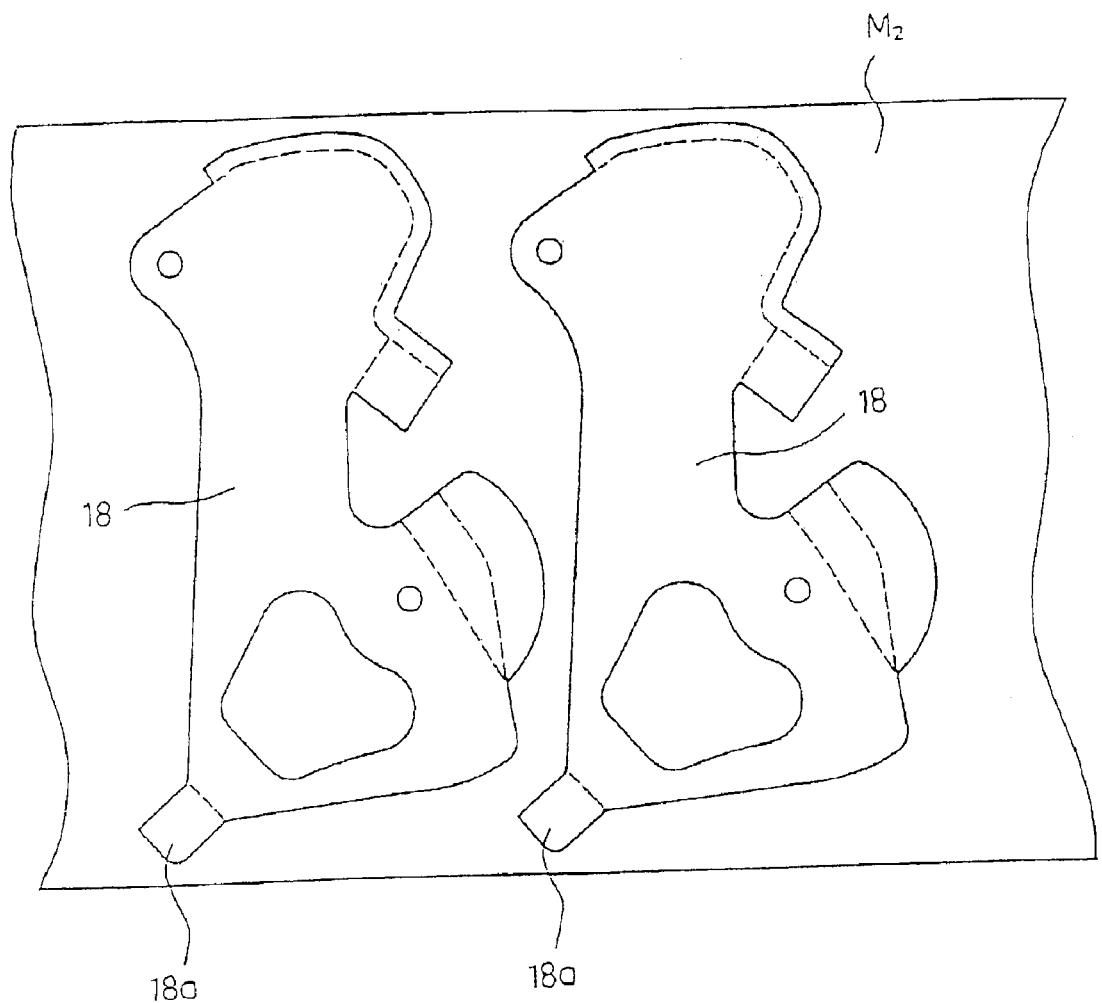
FIG. 5 is a plan view showing a layout of inner plate members on a metal plate to be punched and used for the conventional bicycle rear derailleur illustrated in FIGS. 2 and 3.

Referring now to FIGS. 10(*a*) and 10(*b*), the bending steps for forming the bent portion 182 will be explained in accordance with the first embodiment of the present invention.

As described above, the bent portion 182 is an L-shape member that includes the first bent part 182*a* and the second bent part 182*b* that extends perpendicularly from the first bent part 182*a*. As shown in FIG. 10(*a*), the first bending step includes bending the first bent part 182*a* inwardly, i.e., a direction away from the outer plate member 150, such that it becomes substantially perpendicular to the second bent part 182*b*. Then, as shown in FIG. 10(*b*), the second bending step includes bending the second bent part 182*b* in outwardly, i.e., a direction towards the outer plate member 150, such that the second bent part 182*b* stands substantially perpendicular to the outer frame portion of the inner plate member 180. Accordingly, the two bending steps are used to bend the bent portion 182 into an L-shape and to extend the bent portion 182 from the outer frame portion of the inner plate member 180. As described above, the disengagement prevention portion 190 of the bicycle rear derailleur 100 of the invention is defined by the L-shaped bent portion 182 of the inner plate member 180 and the peripheral section 150' of the outer plate member 150.

Unlike the disengagement prevention portion 19 of the conventional bicycle rear derailleur 10, which is constituted by the first protruded portion 15*a* protruding rearwards outwardly from the tail end of the outer plate member 15 and the second protruded portion 18*a* protruding rearwards outwardly from the tail end of the inner plate member 18, the disengagement prevention portion 190 of the bicycle rear derailleur 100 of the invention is defined by the inner section of the inner plate member 180 (i.e., the bent portion 182) that is spaced inwardly from the external peripheral edge of the inner plate member 180, and the peripheral section 150' of the outer plate member 150. Thus, the widths and areas of the inner plate member 180 and the outer plate member 150 of the bicycle rear derailleur 100 of the present invention are smaller than those of the inner plate member 18 and the outer plate member 15 of the conventional bicycle rear derailleur 10. Consequently, a less amount of each of the metal plates $M_1$ and $M_2$ is required, and the numbers of the inner plate member 180 and the outer plate member 150 which can be punched out from the metal plates $M_1$ and $M_2$ of given sizes increase. As a result, a saving of the material cost for the metal plates is attained and thus, the overall cost of manufacture is reduced. Moreover, the overall weight of the bicycle rear derailleur 100 is reduced too.

Second Embodiment

Figure 11:
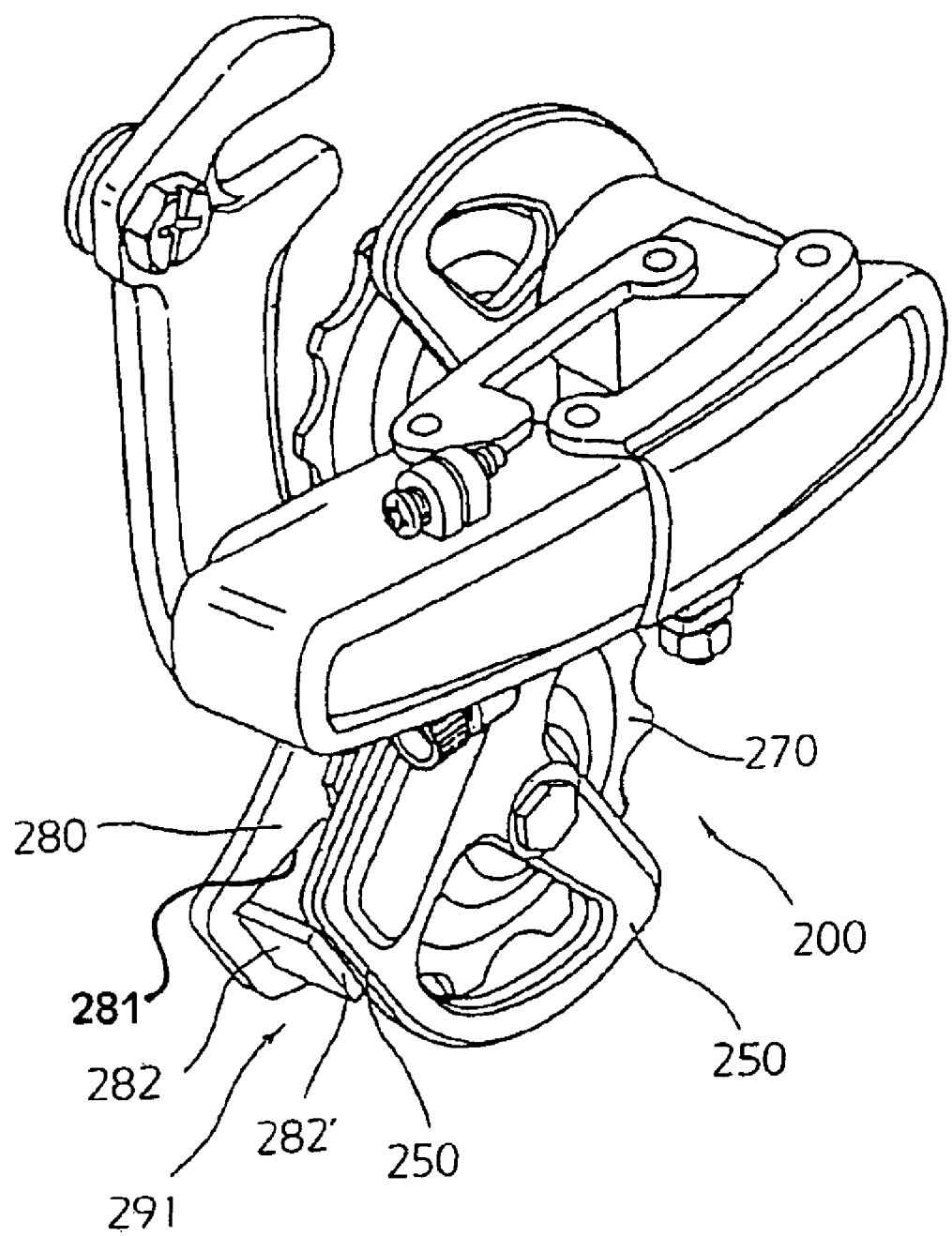
FIG. 11 is a rear end perspective view of a bicycle rear derailleur in accordance with a second embodiment of the present invention.

Referring now to FIG. 11, a bicycle rear derailleur 200 in accordance with a second embodiment will now be explained. The bicycle rear derailleur 200 replaces the bicycle rear derailleur 100 of the bicycle 1 in FIG. 1. Thus, the bicycle rear derailleur 200 is used in conjunction with the parts (e.g., the frame 2, the handlebar 3, the chain 4 and the sprockets 20) of the bicycle 1 illustrated in FIG. 1. The bicycle rear derailleur 200 of the second embodiment is identical to the bicycle rear derailleur 100 of the first embodiment, except for a shape of a bent portion 282 of an inner plate member 280. In view of the similarity between the first and second embodiments, the descriptions of the parts of the second embodiment that are identical to the parts of the first embodiment may be omitted for the sake of brevity.

While the bent portion 182 of the bicycle rear derailleur 100 of the first embodiment is an L-shaped member with the first bent part 182*a* and the second bent part 182*b*, the bent portion 282 of the bicycle rear derailleur 200 of the second embodiment simply extends from the outer frame portion of the inner plate member 280. As with the previous embodiment, the first bent portion 282 is formed from material remaining after formation of an opening or cutout section 281 in the inner plate member 280. Also, a front end edge 282' of the bent portion 282 is located proximal to a peripheral section 250' of an outer plate member 250. Thus, a disengagement prevention portion 291 is defined by the bent portion 282 of the inner plate member 280 and the peripheral section 250' of the outer plate member 250. In this second embodiment of the present invention, the disengagement prevention portion 291 is preferably located adjacent to a tension pulley 270, as seen in FIG. 11.

Since only a single bending step is required to form the bent portion 282 of the bicycle rear derailleur 200 of this second embodiment, the manufacturing process is simplified and the cost is further reduced as compared with the bicycle rear derailleur 100 of the first embodiment described above. Furthermore, with the simple shape of the bent portion 282, the overall weight of the bicycle rear derailleur is further reduced.

Third Embodiment

Figure 12:
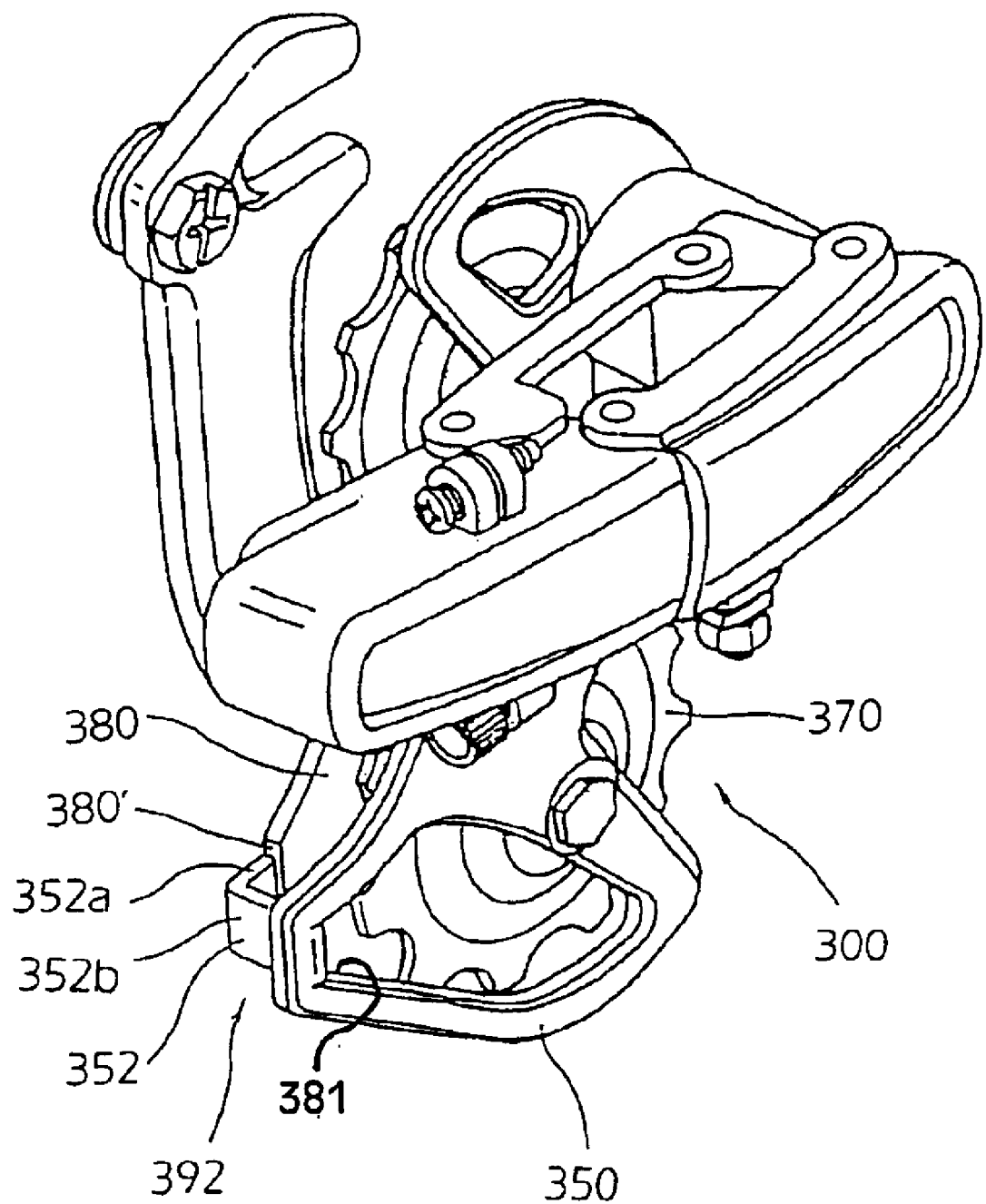
FIG. 12 is a rear end perspective view of a bicycle rear derailleur in accordance with a third embodiment of the present invention.

Referring now to FIG. 12, a bicycle rear derailleur 300 in accordance with a third embodiment will now be explained. The bicycle rear derailleur 300 replaces the bicycle rear derailleur 100 of the bicycle 1 in FIG. 1. Thus, the bicycle rear derailleur 300 is used in conjunction with the parts (e.g., the frame 2, the handlebar 3, the chain 4 and the sprockets 20) of the bicycle 1 illustrated in FIG. 1. The bicycle rear derailleur 300 of the third embodiment is identical to the bicycle rear derailleur 100 of the first embodiment, except for an arrangement of a disengagement prevention portion 392. In view of the similarity between the first and third embodiments, the descriptions of the parts of the third embodiment that are identical to the parts of the first embodiment may be omitted for the sake of brevity.

In the bicycle rear derailleur 100 of the first embodiment, the L-shaped bent portion 182 having the first bent part 182*a* and the second bent part 182*b* is provided at the inner plate member 180. In the bicycle rear derailleur 300 of the third embodiment, on the contrary, an L-shaped bent portion 352 having a first bent part 352*a* and a second bent part 352*b* is provided at an outer plate member 350. The bent portion 352 is formed from material that remains after punching out an opening or cutout portion 381 in the outer plate member 350. Thus, the disengagement prevention portion 392 is defined by the L-shaped bent portion 352 of the outer plate member 350 and a peripheral section 380' of an inner plate member 380. In this third embodiment of the present invention, the disengagement prevention portion 392 is preferably located adjacent to a tension pulley 370 as shown in FIG. 12.

The same functions and effects as those of the bicycle rear derailleur 100 of the first embodiment can be achieved by the bicycle rear derailleur 300 of the third embodiment. Moreover, in the bicycle rear derailleur 300 of the third embodiment, the bent portion 352 provided at the outer plate member 350 is formed into an L-shape with the first bent part 352*a* and the second bent part 352*b* similar to the first embodiment. Of course, it will be apparent to those skilled in the art from this disclosure that the bent portion 352 of the outer plate member 350 can be formed into a shape similar to the bent portion 282 of the inner plate member 280 of the second embodiment described above to thereby achieve the same functions and effects. Thus, the overall cost of manufacture is reduced. Moreover, the weight of the bicycle 1 is reduced too.

Fourth Embodiment

Figure 13:
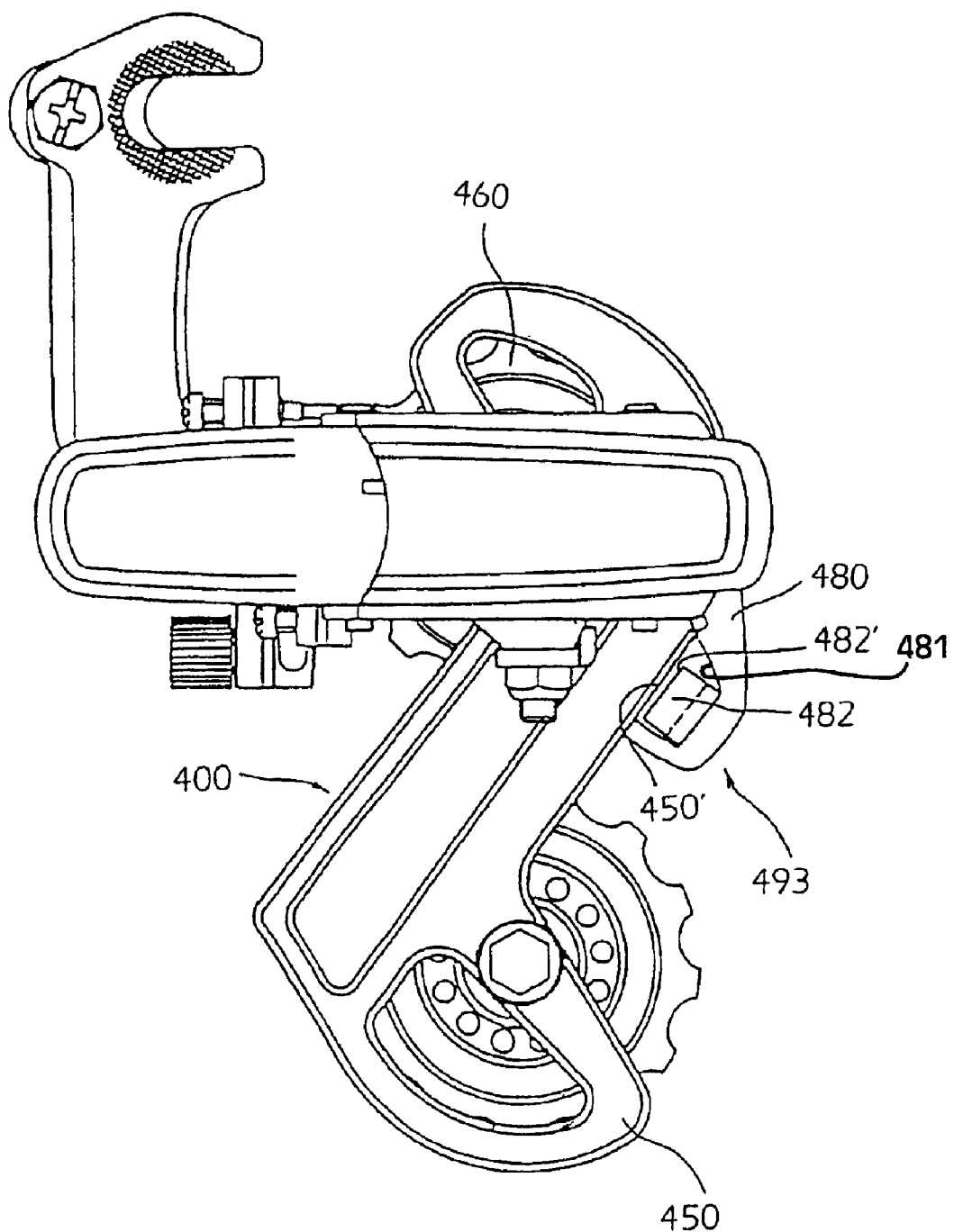
FIG. 13 is an outside elevational view of a bicycle rear derailleur in accordance with a fourth embodiment of the present invention.

Referring now to FIG. 13, a bicycle rear derailleur 400 in accordance with a fourth embodiment of the present invention will now be explained. The bicycle rear derailleur 400 replaces the bicycle rear derailleur 100 of the bicycle 1 in FIG. 1. Thus, the bicycle rear derailleur 400 is used in conjunction with the parts (e.g., the frame 2, the handlebar 3, the chain 4 and the sprockets 20) of the bicycle 1 illustrated in FIG. 1. The bicycle rear derailleur 400 of the fourth embodiment is identical to the bicycle rear derailleur 100 of the first embodiment, except for a location at which a disengagement prevention portion 493 is provided. In view of the similarity between the first and fourth embodiments, the descriptions of the parts of the fourth embodiment that are identical to the parts of the first embodiment may be omitted for the sake of brevity.

In the bicycle rear derailleur 100 of the first embodiment, the disengagement prevention portion 190 is provided near the tension pulley 170 to prevent the chain 4 from disengaging from the tension pulley 170. In this fourth embodiment, the disengagement prevention portion 493 is provided adjacent to a guide pulley 460 to prevent the chain 4 from disengaging from the guide pulley 460.

As shown in FIG. 13, an L-shaped bent portion 482 is formed from an inner section of an inner plate member 480. The inner section of the inner plate member 480 is formed from material remaining after formation of an opening or cutout section 481 formed in the inner plate member 480. Accordingly, the disengagement prevention portion 493 is defined by the L-shaped bent portion 482 and a peripheral section 450' of an outer plate member 450 facing a front end edge 482' of the bent portion 482. Of course, it will be apparent to those skilled in the art from this disclosure that the bent portion can be formed at an inner section of the outer plate member 450 instead of the inner plate member 480. In such a case, a disengagement prevention portion is defined by the bent portion formed on the outer plate member 450 and a peripheral section of the inner plate member 480 that faces a front end edge of the bent portion of the outer plate member 450.

With this bicycle rear derailleur 400 of the fourth embodiment, except for the slightly different function of preventing the chain 4 from disengaging from the guide pulley 460, all of the other functions and effects are the same as those of the bicycle rear derailleur 100 of the first embodiment. Thus, the overall cost of manufacture is reduced. Moreover, the weight of the bicycle 1 is reduced too.

Fifth Embodiment

Figure 14:
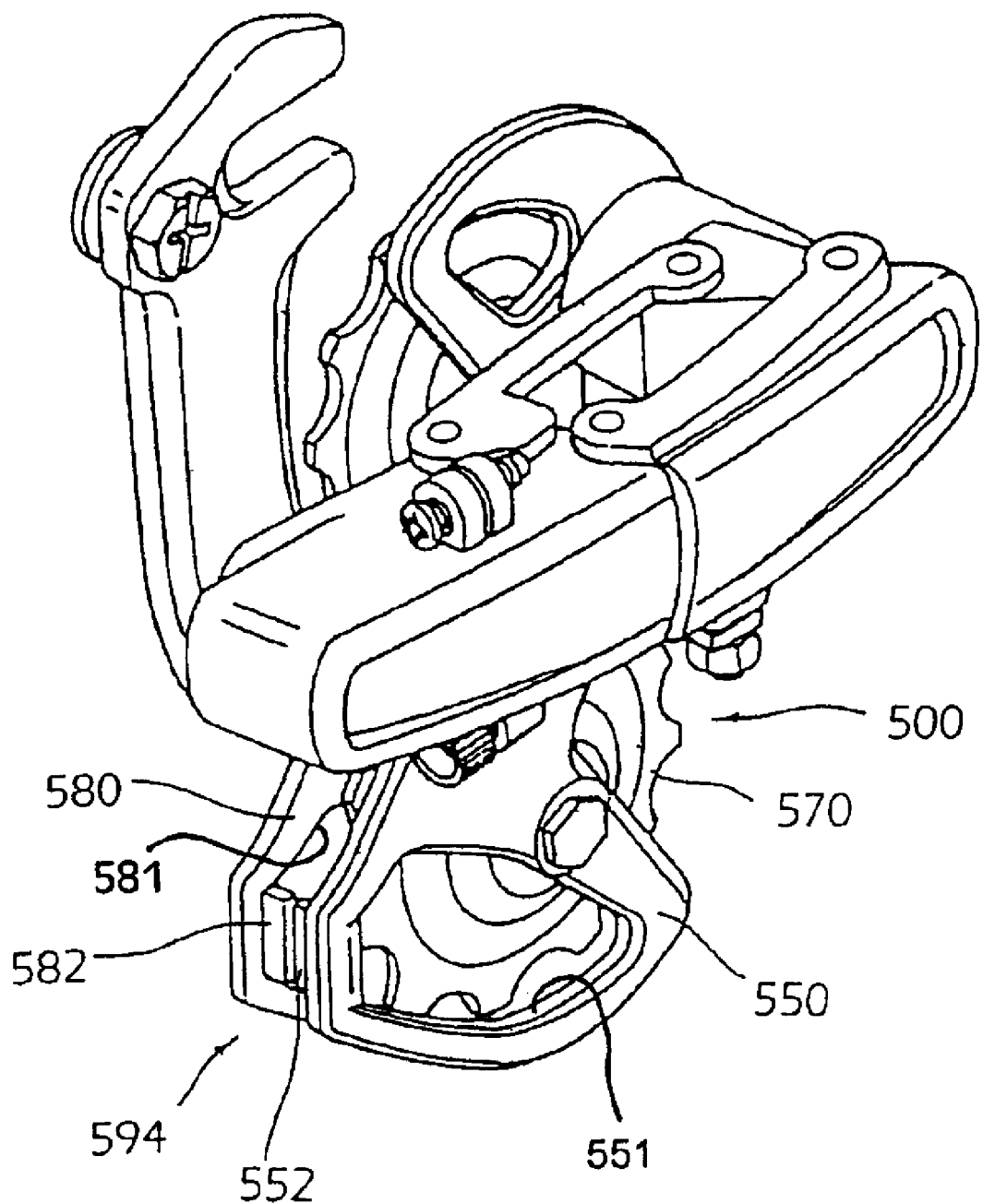
FIG. 14 is a rear end perspective view of a bicycle rear derailleur in accordance with a fifth embodiment of the present invention.

Referring now to FIG. 14, a bicycle rear derailleur 500 in accordance with a fifth embodiment of the present invention will now be explained. The bicycle rear derailleur 500 replaces the bicycle rear derailleur 100 of the bicycle 1 in FIG. 1. Thus, the bicycle rear derailleur 500 is used in conjunction with the parts (e.g., the frame 2, the handlebar 3, the chain 4 and the sprockets 20) of the bicycle 1 illustrated in FIG. 1. Moreover, the bicycle rear derailleur 500 of the fifth embodiment is identical to the bicycle rear derailleur 200 of the second embodiment, except for a construction of a disengagement prevention portion 594. In view of the similarity between the second and fifth embodiments, the descriptions of the parts of the fifth embodiment that are identical to the parts of the second embodiment may be omitted for the sake of brevity.

In the bicycle rear derailleur 200 of the second embodiment described above, the disengagement prevention portion 291 is defined by the bent portion 282 of the inner plate member 280 and the peripheral section 250' of the outer plate member 250. In the second embodiment, the bent portion 282 is formed by bending the inner section of the inner plate member 280 such that it extends from the outer frame portion of the inner plate member 280, as seen in FIG. 11. The peripheral section 250' is located adjacent to the front end edge 282' of the bent portion 282. In contrast, the disengagement prevention portion 594 of the fifth embodiment is defined by an inner bent portion 582 and an outer bent portion 552 as seen in FIG. 14. The inner bent portion 582 is formed by bending an inner section of the inner plate member 580 in a direction towards the outer plate member 550 such that the inner bent portion 582 extends from the outer frame portion of the inner plate member 580. The outer bent portion 552 is formed by bending an inner section of the outer plate member 550 in a direction towards the inner plate member 580 such that the outer bent portion 552 extends from the outer frame portion of the outer plate member 550. It should be understood from the description and FIG. 14 that the outer bent portion 552 is formed from material that remains after formation of an opening or cutout section 551 in the outer plate member 550. Similarly, the inner bent portion 582 is formed from material that remains after formation of an opening or cutout section 581 in the inner plate member 580.

With the structure of the fifth embodiment, each of the inner bent portion 582 of the inner plate member 580 and the outer bent portion 552 of the outer plate member 550 can be formed by a single bending step. The disengagement prevention portion 594 of the fifth embodiment is preferably located adjacent to a tension pulley 570 to prevent the chain 4 from disengaging from the tension pulley 570. Of course, it will be apparent to those skilled in the art from this disclosure that the disengagement prevention portion 594 can be positioned adjacent to a guide pulley 560 to prevent the chain 4 from disengaging from the guide pulley 560. All the other advantages, such as the saving of material and the reduction of cost and weight, are substantially the same as those of the bicycle rear derailleurs 100, 200, 300 and 400 of the first, second, third and fourth embodiments, respectively.

From the above description, it can be appreciated that with the structure of the bicycle rear derailleur according to the present invention, main components of the bicycle rear derailleur, such as the inner and outer plate members, can be made from steel plates having smaller areas, thereby decreasing the amount of material used and hence achieving significant cost reduction and lightweight effect while performance and functions of the bicycle rear derailleur are kept the same as those of a conventional bicycle rear derailleur of the same type.

As used herein, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Chinese Patent Application No. 02 1 06975.1. The entire disclosure of Chinese Patent Application No. 02 1 06975.1 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle rear derailleur for shifting a chain of a bicycle comprising:
   a base member arranged and configured to be coupled to a frame of the bicycle;
   a link mechanism coupled at one end thereof to said base member;
   a movable member coupled to the other end of said link mechanism;
   outer and inner plate members movably coupled to said movable member, said outer and inner plate members having external peripheral edges defining overall shapes of said outer and inner plate members;
   a guide pulley freely rotatably supported between said outer and inner plate members; and
   a tension pulley freely rotatably supported between said outer and inner plate members,
   at least one of said outer and inner plate members including a bent portion integrally formed with said at least one of said outer and inner plate members to prevent said chain from disengaging from at least one of said tension pulley and said guide pulley, said bent portion being formed by bending an inner section of said at least one of outer and inner plate members in a direction towards the other of said at least one of said outer and inner plate members, said inner section extending from an inner periphery of a cutout section of said at least one of said outer and inner plate members.

2. The bicycle rear derailleur according to claim 1, wherein
   said bent portion has a free end with a peripheral edge that faces said external peripheral edge of the other of said inner and outer plate members facing said bent portion.

3. The bicycle rear derailleur according to claim 2, wherein
   said bent portion is located adjacent said tension pulley.

4. The bicycle rear derailleur according to claim 2, wherein
   said bent portion has a first bent part and a second bent part extending perpendicularly from said first bent part to form an L-shaped member.

5. The bicycle rear derailleur according to claim 2, wherein
   said bent portion is located adjacent said guide pulley.

6. The bicycle rear derailleur according to claim 5, wherein
   said bent portion has a first bent part and a second bent part extending perpendicularly from said first bent part to form an L-shaped member.

7. The bicycle rear derailleur according to claim 1, wherein
   said bent portion is formed on said inner plate member.

8. The bicycle rear derailleur according to claim 7, wherein
   said bent portion is located adjacent said tension pulley.

9. The bicycle rear derailleur according to claim 7, wherein
   said bent portion has a first bent part and a second bent part extending perpendicularly from said first bent part to form an L-shaped member.

10. The bicycle rear derailleur according to claim 7, wherein
    said bent portion is located adjacent said guide pulley.

11. The bicycle rear derailleur according to claim 10, wherein
    said bent portion has a first bent part and a second bent part extending perpendicularly from said first bent part to form an L-shaped member.

12. The bicycle rear derailleur according to claim 1, wherein
    said bent portion is formed on said outer plate member.

13. The bicycle rear derailleur according to claim 12, wherein
    said bent portion is located adjacent said tension pulley.

14. The bicycle rear derailleur according to claim 12, wherein
    said bent portion has a first bent part and a second bent part extending perpendicularly from said first bent part to form an L-shaped member.

15. The bicycle rear derailleur according to claim 1, wherein
    said bent portion is located adjacent said tension pulley.

16. The bicycle rear derailleur according to claim 15, wherein
    said bent portion has a first bent part and a second bent part extending perpendicularly from said first bent part to form an L-shaped member.

17. The bicycle rear derailleur according to claim 1, wherein
    said bent portion has a first bent part and a second bent part extending perpendicularly from said first bent part to form an L-shaped member.

18. The bicycle rear derailleur according to claim 1, wherein
    said bent portion is located adjacent said guide pulley.

19. The bicycle rear derailleur according to claim 18, wherein
    said bent portion has a first bent part and a second bent part extending perpendicularly from said first bent part to form an L-shaped member.

20. The bicycle rear derailleur according to claim 1, wherein
    said base member includes a bracket arranged and configured to fixedly coupled to the frame of the bicycle.

21. A bicycle rear derailleur for shifting a chain of a bicycle comprising:
    a base member arranged and configured to be coupled to a frame of the bicycle;
    a link mechanism coupled at one end thereof to said base member;
    a movable member coupled to the other end of said link mechanism;
    outer and inner plate members movably coupled to said movable member, said outer and inner plate members having external peripheral edges defining overall shapes of said outer and inner plate members;
    a guide pulley freely rotatably supported between said outer and inner plate members; and
    a tension pulley freely rotatably supported between said outer and inner plate members,
    said outer and inner plate members including outer and inner bent portions integrally formed with said outer and inner plate members, respectively, to prevent the chain from disengaging from at least one of said tension pulley and said guide pulley, said outer bent portion being formed by bending an inner section of said outer plate member in a direction towards said inner plate member, said inner section of said outer plate member extending from an inner periphery of a cutout section formed in said outer plate member, said inner bent portion being formed by bending an inner section of said inner plate member in a direction towards said outer plate member, said inner section of said inner plate member extending from an inner periphery of a cutout section formed in said inner plate member.

22. The bicycle rear derailleur according to claim 21, wherein said outer and inner bent portions are located adjacent said tension pulley.

* * * * *